US008817857B2

(12) United States Patent
Singh et al.

(10) Patent No.: US 8,817,857 B2
(45) Date of Patent: Aug. 26, 2014

(54) UPBO FOR VECTORED DSL (75) Inventors: Shailendra K. Singh, Fremont, CA (US); Sigurd Schelstraete, Menlo Park, CA (US); Nicholas P. Sands, Menlo Park, CA (US)

(73) Assignee: Ikanos Communications, Inc., Fremont, CA (US)

( * ) Notice: Subject to any disclaimer, the term of this patent is extended or adjusted under 35 U.S.C. 154(b) by 181 days.

(21) Appl. No.: 13/189,666

(22) Filed: Jul. 25, 2011

(65) Prior Publication Data
US 2012/0027060 A1 Feb. 2, 2012

Related U.S. Application Data (60) Provisional application No. 61/368,492, filed on Jul. 28, 2010.

(51) Int. Cl.
*H04B 1/38* (2006.01)
*H04L 5/16* (2006.01)

(52) U.S. Cl.
USPC ...... 375/222; 375/224; 379/406.06; 379/417; 455/522; 370/201

(58) Field of Classification Search
CPC ........ H04B 3/32; H04B 3/464; H04B 1/0475; H04J 1/12
USPC .............. 375/224; 379/406.06, 417; 455/522; 370/201
See application file for complete search history.

(56) References Cited

U.S. PATENT DOCUMENTS

| 6,647,058 | B1 | 11/2003 | Bremer et al. |
| 7,778,346 | B2 | 8/2010 | Cassiers et al. |
| 7,835,368 | B2 | 11/2010 | Duvaut et al. |
| 7,839,919 | B2 | 11/2010 | Stolle et al. |
| 2003/0086514 | A1 | 5/2003 | Ginis et al. |
| 2003/0202570 | A1 | 10/2003 | Bella et al. |
| 2005/0123028 | A1* | 6/2005 | Cioffi et al. ................. 375/222 |
| 2007/0259680 | A1* | 11/2007 | Stolle et al. ................. 455/522 |
| 2008/0192813 | A1* | 8/2008 | Stolle et al. ................. 375/222 |
| 2008/0212768 | A1* | 9/2008 | Zhou ............................ 379/417 |
| 2009/0059780 | A1* | 3/2009 | De Lind Van Wijngaarden et al. ........ 370/201 |
| 2010/0254528 | A1* | 10/2010 | Wei et al. ................. 379/406.06 |

FOREIGN PATENT DOCUMENTS

WO WO2008/003107 A 1/2008

OTHER PUBLICATIONS

Schelstraete, S., "Defining Upstream Power Backoff for VDSL," IEEE Journal on Selected Areas in Communications, vol. 20, No. 5, pp. 1064-1074, Jun. 2002.
Ginis G., et al., "Vectored Transmission for Digital Subscriber Line Systems," IEEE Journal on Selected Areas in Communications, vol. 20, No. 5, pp. 1085-1104, Jun. 2002.
Ginis G., et al., "Vectored-DMT: A FEXT Canceling Modulation Scheme for Coordinating Users," Proceedings of IEEE ICC 2001, vol. 1, pp. 305-309, Jun. 2001, Helsinki, Finland.

* cited by examiner

*Primary Examiner* — Sam K Ahn
*Assistant Examiner* — Fabricio R Murillo Garcia
(74) *Attorney, Agent, or Firm* — Pillsbury Winthrop Shaw Pittman LLP (57) ABSTRACT Residual FEXT resulting from intended and/or inherent partial cancellation of crosstalk in vectored DSL systems impairs upstream power back-off (UPBO) as traditionally implemented. By considering and taking into account the effects of residual crosstalk on vectored DSL system performance and operation, improved data rates and/or other vectored DSL system performance are realized through the use of UPBO parameters generated for a given residual FEXT environment.

14 Claims, 6 Drawing Sheets

UPBO FOR VECTORED DSL

PRIORITY CLAIM AND CROSS-REFERENCE TO RELATED APPLICATIONS

This application claims priority to and the benefit of the following prior filed co-pending application:

U.S. Ser. No. 61/368,492 filed Jul. 28, 2010, entitled UPSTREAM POWER BACK OFF FOR MIMO VDSL (VECTORING), the entire disclosure of which is incorporated herein by reference in its entirety for all purposes

TECHNICAL FIELD

The present invention relates generally to the field of vectored DSL communication systems.

BACKGROUND

Digital Subscriber Line (DSL) communications suffer from various forms of interference, including crosstalk. Various techniques have been developed to combat this interference and its deleterious effects on data transmission. Vectored DSL has been one measure developed to address this problem. Additionally, bit rate capacities of DSL user lines subject to far-end crosstalk (FEXT) have been improved by adjusting transmit power spectral densities (PSDs) based on DSL loop lengths and other considerations. Systems, methods, apparatus and/or other implementations that provide improved vectored DSL system operation and improved mitigation of the near-far problem described herein would represent a significant advancement in the art.

SUMMARY

UPBO is used in DSL systems to "build-out" or deliberately lengthen the perceived length of short DSL loops by reducing CPE transmit power in a way that does not require it to know the effect it has as a disturber on any victim (no collusion is needed, only a self-contained estimate of its electrical length based on attenuation or other methods). Typically loops below an operator-defined limit (the reference-length) are treated in this way, while units on longer loops transmit with full power. This limits the upstream rate to approximately a FEXT-free rate at the reference length. The penalty is taken fully by lines shorter than the reference length. In the context of vectoring, most of the crosstalk effect is removed at the receiver by a canceller, however some residual crosstalk typically is left over, either by planned partial cancellation, or (if full cancellation is used) due to the effect of implementation losses (finite precision, estimation errors etc). UPBO settings are changed in embodiments disclosed herein using or based on one or more performance metrics so that the reference length is shorter (and the rate limit correspondingly higher), often to an extent that the residual FEXT is largely insignificant at the receiver relative to the receiver noise. These embodiments can be implemented in both vectored and non-vectored DSL systems with no changes to modem firmware. Adjusted UPBO settings can be based on simulation (e.g., by deciding a priori on a selected upstream rate limit), and power cutback details are again self-contained (no collusion needed) and applied by the CPE if it has an adequate estimate of electrical length. No knowledge of FEXT ingress details, nor of residual FEXT is needed. However, in some embodiments more performance can be gained if the power cutback was informed by inspection of upstream FEXT coefficients for example, which would complicate modem startup procedures and might not be G. vector compliant.

BRIEF DESCRIPTION OF DRAWINGS

The present invention will be readily understood by the following detailed description in conjunction with the accompanying drawings, wherein like reference numerals designate like structural elements, and in which.

DETAILED DESCRIPTION

The following detailed description will refer to one or more embodiments, but the present invention is not limited to such embodiments. Rather, the detailed description and any embodiment(s) presented are intended only to be illustrative and to cover all alternatives, modifications, equivalents, etc. included within the spirit and scope of the disclosure as defined by the appended claims. Those skilled in the art will readily appreciate that the detailed description given herein with respect to the Figures is provided for explanatory purposes as the invention extends beyond these limited embodiments.

Certain terms are used throughout the description and claims to refer to particular system components. As one skilled in the art will appreciate, components may be referred to in the art by different names. This disclosure does not intend to distinguish between components that differ insubstantially. Phrases such as "coupled to" and "connected to" and the like are used herein to describe a connection between two devices, elements and/or components and are intended to mean physically and/or electrically either coupled directly together, or coupled indirectly together, for example via one or more intervening elements or components or via a wireless connection, where appropriate. The terms "chip" and "processor" refer broadly to hardware devices that operate in a prescribed manner, for example to process data, and can include various types of such devices (for example, a field-programmable gate array (FPGA), a digital signal processing (DSP) chip, an application-specific integrated circuit (ASIC), an integrated circuit (IC), etc., as well as more complex devices or combinations of such devices such as computers). The term "system" refers broadly to a collection of two or more components and may be used to refer to an overall system (e.g., a computer and/or communication system or a network comprising one or more computers, communication components, etc.), a subsystem provided as part of a larger system (e.g., a subsystem within an individual computer), and/or a process or method pertaining to operation of such a system or subsystem. In this specification and the appended claims, the singular forms "a," "an," and "the" include plurals unless the context clearly dictates otherwise. Unless defined otherwise, technical and scientific terms used herein have the same meanings that are not inconsistent to one of ordinary skill in the art relevant subject matter disclosed and discussed herein.

Reference in the specification to "some embodiments," "one embodiment," "an embodiment," etc. of the present invention means that a particular feature, structure or characteristic described in connection with such embodiment(s) is included in at least one embodiment of the present invention. Thus, the appearances of the noted phrases in various places throughout the specification are not necessarily all referring to the same embodiment.

In the absence of crosstalk, the existing copper telephone infrastructure can in theory be utilized to carry from tens to hundreds of megabits per second over distances up to approximately 5,000 feet using discrete multitone (DMT) digital subscriber line (DSL) modem technology. DMT modems divide the available bandwidth into many sub-carriers (also referred to as "tones" or "frequency bins") that are synchronized and independently modulated with digital QAM data to form an aggregate communication channel between the network and subscriber. DMT-based DSL systems typically use Frequency Division Multiplexing (FDM) and assign particular sub-carriers to either downstream (that is, from DSLAM/CO to CPE/user) or upstream (from CPE/user to DSLAM/CO) directions. This FDM strategy limits near end crosstalk (NEXT). DMT systems are typically very robust in the presence of radio frequency interference (RFI) and other types of frequency-selective noise (or interference) or channel dispersion, because each sub-carrier can be independently modulated with an appropriate amount of data and power in order to meet the system requirements and the desired bit error rate.

Typical telephone binder cables typically contain between 10 and 50 unshielded copper twisted pairs (these binders are then bundled into larger cables). Due to variations in manufacturing and imperfect cable installation (for example, bending, etc.), significant levels of far-end crosstalk (FEXT) occur between each twisted pair within a binder (and between adjacent binders). More specific discussions concerning FEXT can be found in the various patent applications filed by Ikanos Communications, Inc.; Vector Silicon, Inc.; Adaptive Spectrum and Signal Alignment Inc.; and Stanford University. As a result of typical cable construction, installation and deployment techniques, each twisted pair is physically adjacent to many other twisted pairs in (or outside) its binder for a significant distance in the cable. While there is variation in the FEXT levels as a result of manufacturing variation, the net result is that every copper pair imparts some amount of FEXT onto virtually every other copper pair in the cable. In many instances, the FEXT can be as much as or more than 40 dB higher than the background noise level on the line and the crosstalk typically increases with frequency. Cable measurements have shown that each particular line has at least, and often more than, 5 to 10 disturbers that impact the line's performance. As a result, FEXT is the dominant impairment in reaching high data rates in DMT DSL systems.

DSL systems using frequency division duplexing (FDD) transmission schemes for downstream and upstream transmissions also suffer from the so-called "near-far" problem, where modems on shorter loops (i.e., located closer to the central office (CO)) generate FEXT that disproportionately disturbs modems on longer loops in upstream transmissions. Downstream-end DSL devices like user modems and other customer premises equipment (CPE) on shorter lines are thus typically required to reduce their transmit PSDs in order to reduce the FEXT caused in DSL transmissions on longer lines, often by means of a parameterized upstream power back-off (UPBO) approach that is well known to those skilled in the art. In such UPBO schemes, a required or suggested PSD is represented using two parameters (such a revised PSD is a function of frequency and the two power back-off parameters, usually expressed as the "a" and "b" UPBO parameters). CPEs are typically capable of receiving such UPBO parameters from the CO and thus adjusting their PSDs. More information regarding UPBO and its use in VDSL systems and the like can be found in "Defining Upstream Power Backoff for VDSL," by Sigurd Schelstraete (IEEE Journal on Selected Areas in Communication, Vol. 20, No. 5—June 2002); and G. Vector: Crosstalk model for residual crosstalk," by Sigurd Schelstraete (ITU—Telecommunication Standardization Sector Study Group contribution—August 2010); both of which are incorporated by reference in their entireties for all purposes. The following patent documents are incorporated by reference in their entireties for all purposes: U.S. Pat. No. 7,835,368 B2, entitled "Systems and Methods for Mitigating the Effects of Upstream Far-End Cross Talk" and issued on 16 Nov. 2010; U.S. Pub. No. 2005/0123028 A1, entitled "Adaptive Margin and Band Control" and published on 9 Jun. 2005; WIPO Pub. No. WO 2008/003107 A1, entitled "Method of Optimizing Bit Rate Capacities of DSL User Lines" and published on 10 Jan. 2008; U.S. Pat. No. 7,778, 346 B2, entitled "Upstream Power Cutback" and issued on 17 Aug. 2010; U.S. Pat. No. 7,839,919 B2, entitled "Adjusting Transmit Power Spectra of Transceiver Devices in a Communications Network" and issued on 23 Nov. 2010.

An advanced DSL signal processing technique called "vectoring" cancels (i.e., reduces, mitigates, completely cancels, etc.) FEXT between twisted pairs and thus permits dramatically higher data rates. Vectoring is well known to those skilled in the art, and is explained in more detail in "Vectored Transmission for Digital Subscriber Line Systems," by G. Ginis and J. Cioffi (IEEE JSAC special issue on twisted-pair transmission, Vol. 20, Issue 5, pp. 1085-1104, June 2002); and "Vectored-DMT: A FEXT Cancelling Modulation Scheme for Coordinating Users," by G. Ginis and J. Cioffi (Proceedings of IEEE ICC 2001, Vol. 1, Helsinki, Finland, pp. 305-09, June 2001), both of which are incorporated by reference herein for all purposes. The basic principle behind vectoring is coordinating transmissions and receptions between all twisted pairs in a "vectored group" within a telephone cable. Because all twisted pairs in the cable terminate in one central upstream-end DSL apparatus known as a DSLAM (DSL access multiplexer), the DSLAM is the natural location to coordinate this communication. To perform vectoring effectively in a vectored DSL system's modems, the modems must be (1) synchronized to the same DMT symbol clock and (2) have synchronized training/tracking periods with pre-arranged training data patterns (unique to each modem) to allow victim modems to identify crosstalk channel characteristics between particular disturber-victim modem pairs. As will be appreciated by those skilled in the art, there are a variety of techniques for identifying crosstalk in such systems, including one or more that may be described in various applicable standards pertaining to DSL systems and their implementation.

Using crosstalk modeling (which typically is represented as a matrix containing coefficients representing the various crosstalk relationships between DSL lines determined during training, tracking and the like), transmit pre-compensation (e.g., precoding) can be used in the downstream direction (from DSLAM to customer site). In the upstream direction (from downstream-end customer site to upstream-end DSLAM), MIMO (multiple-input-multiple-output) spatial filtering is used at the DSLAM to cancel upstream FEXT at the upstream receive side. Identification and tracking of the FEXT cancellation filter coefficients may be performed using the minimum mean square error (MMSE) estimates and the LMS (Least Mean Squares) adaptive algorithm or other Least-Squares type methods, as is well known to those skilled in the art. Generally, a crosstalk canceller performs compensation at an upstream-end DSL device (e.g., a DSLAM, a line card, an optical networking unit, receiver, etc.) for undesired FEXT on subscriber lines. Cancellation is performed by means of a matrix operation that receives data samples (e.g., FFT outputs or FEQ outputs) and outputs compensated data for input to an FEQ or constellation demapper, thus cancelling FEXT in the DSL vectored group.

A "full" FEXT cancellation scheme (cancelling all FEXT for all disturbers on all frequencies) for a vectored group having U users requires computations of the order $U^2$ per DMT symbol period. In a DSL system with nearly 4,096 tones and with only 10 vectored users, the complexity level for "full" FEXT cancellation is on the order of billions of flops per second and power dissipation in FEXT mitigation devices is proportional to the complexity of the FEXT mitigation algorithm. Those skilled in the art will appreciate that such a degree of complexity involved in any full FEXT cancellation is thus presently impractical. Moreover, perfect cancellation in such systems is rarely, if ever, possible, due to imperfections in the generation and updating of cancellation coefficients, as well as imperfections in the processing techniques used in such systems. As such, partial FEXT cancellation schemes have been devised and implemented to provide reasonable use of available computational resources to perform FEXT cancellation and to enhance data rates.

Various methods, techniques, etc. have therefore been developed for performing "partial" upstream FEXT cancellation for a given vectored user. Some embodiments of partial FEXT cancellation comprise ranking or ordering system users (i.e., DSL lines) based on coupling and input signal levels. In other embodiments, FEXT cancellation comprises a selection phase during which a determination regarding each disturber is made based on whether or not to process the input of each respective disturber. Each determination is made independently of other disturbers' contributions. In such embodiments, a threshold approach can be used during the selection phase. Various factors determine the threshold and can include but are not limited to: the average input signal energy level, the amplitude of the coupling channel, and the targeted level of residual FEXT after partial FEXT cancellation is performed. Various embodiments for partial FEXT cancellation result in a reduction of power consumption and allow multiplexing or sharing of computational resources. Other embodiments also provide a reduction in the data bandwidth requirements. More detail concerning these types of systems and methods can be found in United States Publication No. 2010/0220823 A1, published 2 Sep. 2010, entitled System And Methods For Mitigating Self-Induced Far-End Crosstalk, the entire disclosure of which is incorporated by reference herein for all purposes.

For a given vectored victim, the average power of noise due to FEXT is a function of the crosstalk coupling between the victim and the disturber and the average transmit symbol power of the disturber. This has led to derivation disturber line selection methods ("line selection") that select disturbers to process in a partial cancellation scheme, e.g., based on their average transmit power and coupling into the victim user. This disturber selection typically is performed infrequently, as the number of users, average transmit energy of each disturbers, and their relative contribution into the victim user usually vary slowly in time. The variation in instantaneous transmitted energy of the disturber can be factored in, as well as the energy consequently received, in order to select the disturbers that must be cancelled on a specific tone for a given victim on a DMT symbol-by-symbol basis. A related partial cancellation issue involves intelligently choosing the tones ("tone selection") for performing FEXT cancellation according to available computations resources in order to achieve, e.g., optimum performance given the available resources. Further, line selection and tone selection can be jointly performed. Other factors and variations are well known to those skilled in the art.

Embodiments of upstream power back-off ("UPBO") for vectored DSL herein improve vectored DSL system performance by improving UPBO in vectored DSL in the presence of residual FEXT (e.g., when dominant FEXT disturbers have been removed, when crosstalk cancellation coefficients are not accurate enough to perfectly cancel the FEXT in upstream transmissions, etc.), as described in more detail below. Because residual crosstalk is necessarily present in practical vectored systems due to partial cancellation, UPBO embodiments herein are especially relevant for vectored DSL deployment. However, UPBO settings traditionally used for non-vectored systems are deficient when used in connection with vectored systems. The presence of residual FEXT does not eliminate the near-far problem originally compelling use of UPBO, but instead significantly changes that problem so that traditional UPBO is ineffective. UPBO settings according to embodiments disclosed herein improve vectored DSL system performance in the upstream direction compared to both (1) vectored systems using traditional UPBO settings and (2) vectored systems using no use of UPBO at all.

Figure 1:
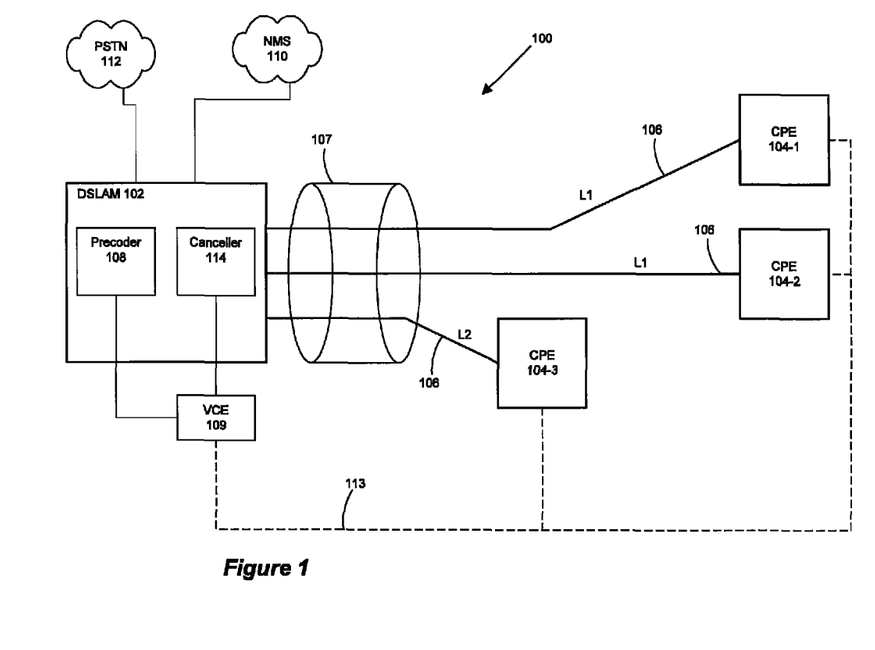
FIG. 1 is a block diagram of a vectored DSL system in which the near-far problem can arise and in which one or more embodiments of the present invention can be implemented.

FIG. 1 illustrates an exemplary vectored group DSL system 100 (e.g., VDSL, VDSL2, ADSL, etc.) in which embodiments of UPBO for vectored DSL can be implemented, system 100 comprising an upstream-end DSL device (CO side DSLAM 102) and a plurality of U downstream-end DSL devices (CPEs 104) coupled to DSLAM 102 via subscriber lines 106. Subscriber lines 106 are bundled in a binder 107. DSLAM 102 includes a crosstalk precoder 108 and a crosstalk canceller 114 coupled to subscriber lines 106. Additionally, DSL system 100 comprises a vectoring control entity (VCE) 109 coupled to precoder 108 and canceller 114, and coupled to CPEs 104 via one or more channels 113 (channels 113 between CPEs 104 and VCE 109 may be upstream logical data paths from CPEs 104 to DSLAM 102 and may not be physically separated from subscriber lines 106). Other configurations of the canceller 114, precoder 108 and VCE 109 are known and can be used in various embodiments.

CPEs 104 transmit error feedback signals via channels 113 through subscriber lines 106 to receivers in the DSLAM 102, which then extract and send the error feedback signals to VCE 109. Also, DSLAM 102 may optionally be coupled to a network management system (NMS) 110 and a public switched telephone network (PSTN) 112. In other embodiments, DSLAM 102 can be modified to include splitters, filters, management entities, and various other hardware, software, and functionalities. NMS 110 can be a network management infrastructure that processes data exchanged with DSLAM 102. DSLAM 102 comprises a plurality of DSL transceivers (e.g. VTU-Os) that exchange signals between the VCE 109, canceller 114, precoder 108, NMS 110, the PSTN 112, and/or subscriber lines 106. DSL signals are received and transmitted using the DSL transceiver, which can be a modem, etc. CPEs 104 each comprise a DSL transceiver (e.g. a VTU-R) to transmit data from each CPE 104 to DSLAM 102 via subscriber line 106. A variety of other upstream-end and downstream-end configurations and equipment are possible and the exemplary configuration of FIG. 1 is not limiting, as will be appreciated by those skilled in the art.

Figure 2:
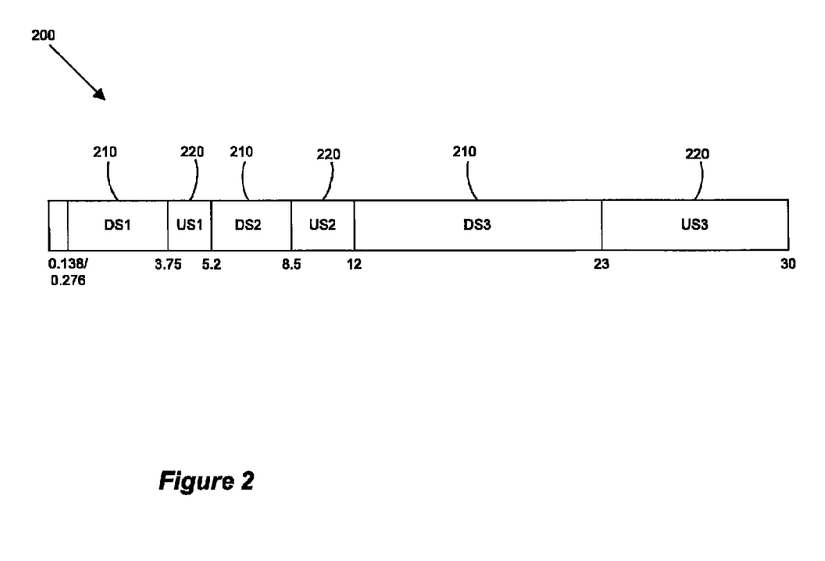
FIG. 2 is a diagram of an upstream/downstream frequency band scheme usable in vectored DSL systems and with one or more embodiments of the present invention.

Canceller 114 is configured to cancel crosstalk in upstream DSL transmissions using a partial crosstalk cancellation scheme to reduce crosstalk noise in upstream signals. According to one or more applicable partial crosstalk cancellation schemes, signals are received and processed from CPEs 104 to determine a subset of crosstalk disturbers, tones, channels, lines, etc. that contribute the highest crosstalk noise levels to each line in the vectored group (e.g., canceller 114 may process signals to identify the most dominant crosstalk line sources or crosstalk channels). The near-far scenario can be seen in FIG. 1 where CPE unit 104-1 and unit 104-2 are a longer distance/loop length (L1) from DSLAM 102 than CPE unit 104-3 (distance/loop length L2); this can lead to shorter DSL line of CPE 104-3 causing strong FEXT in upstream signals from CPE 104-1 and CPE 104-2. Canceller 114 then uses the signals (and/or related information) that correspond to the identified subset of crosstalk disturbers, tones, channels, lines, etc. to reduce crosstalk. Addressing only the most dominant crosstalk sources instead of all crosstalk sources in some embodiments reduces processing time and complexity of crosstalk cancellation, as noted above. Thus, partial crosstalk cancellation provides a tradeoff between material reduction in crosstalk noise and required processing and complexity. FIG. 2 illustrates a typical DSL system band plan 200, with a number of downstream bands 210 and a number of upstream bands 220 (e.g., band 1 to M), which can be used in connection with embodiments of UPBO for vectored DSL herein.

A multiple-input multiple-output (MIMO) DSL system can be characterized by its system (or channel) responses from each input to each output of the system. For example, in the U user system of FIG. 1, inputs 1 through U and outputs 1 through U have system responses $H_{ij}$ (FEXT channel responses/coefficients for $i \neq j$, and direct channel responses/coefficients for $i=j$), namely $H_{11}, H_{12}, \ldots, H_{1U}, H_{21}, \ldots, H_{U1}, H_{U2}, \ldots, H_{UU}$. If $H[k]=h_{i,j}[k]$, $(i,j=1:U)$ is the model for a U user scenario for tone k, then the crosstalk channels can be defined as $h_{i,j}[k]$, $i \neq j$. For a transmit signal vector $x_i[k]$, the received signal vector $y_i[k]$ before any crosstalk cancellation can be represented as:

$$y_i[k] = h_{i,i} x_i[k] + n_i[k] + \sum_{j \neq i}^{U} h_{i,j}[k] x_j[k]$$

where $n_i[k]$ is the additive white noise. Vectored DSL uses crosstalk channel estimates $\hat{H}[k]=\hat{h}_{i,j}[k]$, $(i,j=1:U)$, which can then be incorporated into the equation for received signal vector $y_i[k]$, above, as:

$$y_i[k] = h_{i,i} x_i[k] + n_i[k] + \sum_{j \neq i}^{U} (h_{i,j}[k] - \hat{h}_{i,j}[k]) x_j[k]$$

Only in cases of perfect and complete crosstalk cancellation (i.e., where $h_{i,j}[k]=\hat{h}_{i,j}[k]$) will there be no residual crosstalk (i.e., $y_i[k]=h_{i,i}x_i[k]+n_i[k]$). Otherwise, depending on the type of canceller employed, the quality of the cancellation coefficients and size of the vectored group, a certain amount of residual FEXT will remain after cancellation. In cases where such residual FEXT exists, the UPBO settings impact vectored DSL system performance in the presence of the residual FEXT. Whether UPBO is still required for a vectored DSL system implementing partial cancellation must be determined in the context of the particular cancellation scheme implemented. For example, removal of the strongest disturbers by partial FEXT cancellation might remove the primary reason that UPBO was implemented in DSL systems, to deal specifically with such crosstalkers. The residual FEXT can be assumed to result from cancelling less than all of the detectable FEXT in the DSL system and/or from imperfect cancellation, even where a system is attempting to cancel all FEXT. Residual FEXT resulting from the system's (inherent and/or designed) limitations can still materially impact upstream performance—especially for long loops. In the absence of UPBO, long reach performance for certain rates may be materially limited by the residual FEXT.

Figure 3:
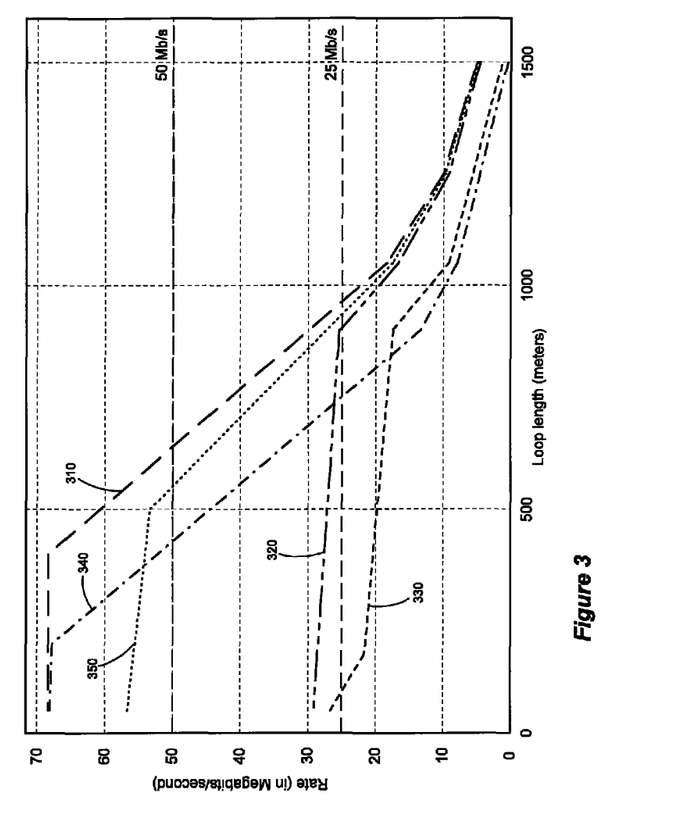
FIG. 3 is a data plot showing various exemplary performance data to illustrate distinctions between various uses of vectoring and UPBO in vectored DSL systems, including one or more embodiments of the present invention.

FIG. 3 shows five sets of exemplary performance data to illustrate distinctions between various uses of vectoring and UPBO in vectored DSL systems:

Data set 310—A "fully-vectored" DSL system without UPBO (i.e., 100% of far-end crosstalk is completely and perfectly removed and no UPBO applied—UPBO is unnecessary if all FEXT is removed from upstream transmissions from all disturbers, whether short-looped or long-looped; data 310 is not considered to be realistic because perfect cancellation is unlikely to be achievable in a real-world DSL system);

Data set 320—A "traditional partially-vectored" DSL system with traditional UPBO (i.e., less than all disturbers'/tones' crosstalk is removed; residual FEXT remains; and traditional UPBO settings (see Table 1, below) and techniques are applied);

Data set 330—A "traditional non-vectored" DSL system using UPBO (i.e., where no vectoring is implemented, but traditional UPBO settings (see Table 1, below) and techniques are applied);

Data set 340—A "no-UPBO partially-vectored" DSL system with no UPBO (i.e., no UPBO is applied; crosstalk from less than all disturbers/tones is removed, so residual FEXT remains);

Data set 350—A "new partially-vectored" DSL system with UPBO according to one or more embodiments herein (i.e., crosstalk from less than all disturbers/tones is removed, residual FEXT remains, and UPBO is applied according to one or more embodiments disclosed herein, for example using the UPBO settings from Table 2, below, which can be the result of a limited search with the goal of improving upstream performance).

TABLE 1

Traditional UPBO settings (e.g., obtained from a DSL standard)

| Parameter | Upstream Band 1 | Upstream Band 2 |
|---|---|---|
| a | 60 | 60 |
| b | 22 | 17.18 |

TABLE 2

UPBO settings according to one or more disclosed embodiments

| Parameter | Upstream Band 1 | Upstream Band 2 |
|---|---|---|
| a | 67 | 67 |
| b | 13 | 8.18 |

As shown in FIG. 3, the full benefits of vectoring may not be realized with traditional UPBO settings. When traditional UPBO is applied, upstream performance after crosstalk cancelling is only marginally better than without crosstalk cancelling. Crosstalk no longer is the major factor affecting performance; instead, the way the transmit PSD is limited for the shorter loops has a substantial impact. Data set 340 shows the performance with vectoring in the absence of the UPBO and how it compares with the rates shown in data sets 310, 320 and 330. Data rates for short loops (e.g., length shorter than 700 meters) has improved at the cost of the longer loops. The impact of residual FEXT on longer loops is still significant enough to degrade their performance to a level worse than the performance shown in data set 330 from a non-vectored DSL system having full FEXT effects with traditional UPBO in use. In such cases, UPBO is very relevant in a partial-crosstalk environment—mainly for the benefit of longer loops. UPBO can only be removed in a scenario with perfect cancelling of all disturbers for every line; otherwise it still appears necessary to protect data rates on longer loops. In the light of the above, different UPBO settings must be used for vectored VDSL systems having residual FEXT. In some cases new UPBO settings can depend on the size of the vectored group and on the system's ability to cancel the FEXT.

In some embodiments, therefore, UPBO parameters are optimized for the specific design of the vectoring system (e.g., taking into account the number of users in the vectored group, the amount of residual FEXT typically found in the system, etc.) and/or based on one or more measured, simulated and/or estimated performance metrics (e.g., data rate). In some embodiments of UPBO for vectored DSL, trade-offs or balancing can be evaluated between the amount/degree of FEXT cancelling performed at the CO and the degree of UPBO needed at the CPE transmitters. In some cases, this evaluation also can include revising the reference length k/0 used for a given DSL system or DSL type. A suitable optimization or other balancing of (1) the relative amount of FEXT cancellation versus (2) needed UPBO achieves significantly higher upstream rates for all loop lengths, as reflected for example in data set 350. Data set 350 shows that, in presence of the residual FEXT and with new UPBO settings applied, the data rate for loops longer than 400 meters can be improved considerably, while generating only a slight drop in data rates for shorter loops. However, even this slight drop does not decrease data rates below 50 Mb/s. No system using traditional UPBO in FIG. 3 achieves rates at or above 50 Mb/s, or reach is limited and comes at the expense of longer loops' performance. New UPBO settings according to embodiments of UPBO for vectored VDSL systems herein consistently generate performance better than traditional UPBO settings optimized for the full FEXT environment of data set 330 and better than the case where no UPBO is applied at all, in data set 340. Thus, UPBO settings that work well for a non-vectored DSL environment do not necessarily improve vectored system performance.

Examples presented above assume that, for every loop in the vectored group, the crosstalk from dominant disturbers has been at least partially cancelled to reduce its impact. The presence of legacy loops and/or uncancelled dominant disturbers from a different group (e.g. a different line card in case of per-line-card cancelling) may be restrictive. Hence, to achieve better benefits from embodiments of UPBO for vectored DSL, all vectored loops serving from one cabinet are preferably part of the single vectored group and no mixing of legacy lines with vectored lines is allowed. However some embodiments are not so limited. If there are legacy lines, they are accounted for in other embodiments as "uncancelled disturbers with traditional UPBO." In this setting, UPBO can practically be handled as a per-VCE setting. UPBO can then be optimized in combination with the knowledge of the vectored group and the capabilities of the crosstalk canceller.

In vectored DSL upstream transmissions, removal of dominant disturbers by partial FEXT cancellation enables a relaxation in power cutback for short loops that would otherwise be needed in a non-vectored environment (i.e., with full FEXT). With the new UPBO settings, improved gains from vectoring are realized, even with only partial cancellation. New vectored DSL UPBO settings depend on the residual FEXT and its effect on received signals, and therefore on a canceller's performance. Improved UPBO settings can be derived at the CO or a metric related to canceller performance can be sent to vectored CPEs to enable the CPEs to obtain new improved UPBO settings.

Figure 4:
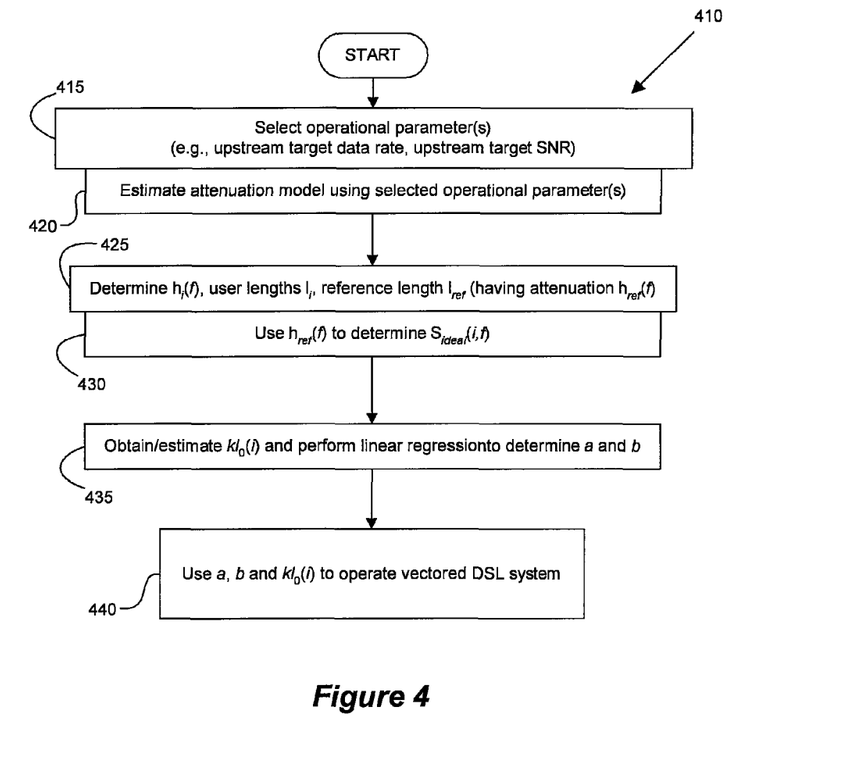
FIG. 4 is flow diagram illustrating one or more embodiments of the present invention.

In some embodiments of UPBO for vectored DSL, for example process 410 in FIG. 4, an operational or performance parameter or metric (e.g., upstream target data rate or signal to noise ratio (SNR)) is set, determined or otherwise assigned at 415 to all vectored group lines (e.g., a DSL vendor's upstream customer data rate or SNR in a given DSL system). Various performance metrics used with embodiments herein can be measured, simulated and/or estimated. A target data rate can serve in some embodiments as the basis for implementing UPBO parameters and better operation that is tuned to the system in which it is used. Because of DSL system performance improvements that can be realized from vectored operation, target maximum data rates for vectored DSL are substantially higher than for non-vectored systems.

Using a target maximum data rate or other selected parameter for users in a given vectored DSL system, an attenuation model can be estimated at 420 using (1) a PSD (e.g., obtained from an applicable DSL standard), (2) a deployment model (e.g., which can include various system features), (3) the wire/twisted pair/cable physical and/or characteristics (e.g., 24 AWG copper, etc.), and (4) known receiver noise characteristics. Other information and/or characteristics might be considered. The attenuation model thus obtained provides at 425 values of $h_i(f)$ for various frequencies and user lengths $l_i$ and allows the calculation of a reference length $l_{ref}$ based on solving (e.g., iteratively) an equation for the data rate as a function of loop length (using a model of the loop attenuation as a function of length and frequency and the receiver noise). That is, $l_{ref}$ is the loop length at which the exact target data rate can be achieved for a given frequency f using the prescribed PSD.

Using this information, $h_{ref}(f)$ is the channel attenuation at the solution (reference) length $l_{ref}$. Using this at 430, an ideal (backed-off) transmit PSD for user i at frequency f can be calculated:

$$S_{ideal}(i, f) = \min[S_{nominal}(f), S_{nominal}(f) + h_{ref}(f) - h_i(f)]$$
$$= S_{nominal} - \max[0, h_{ref}(f) - h_i(f)]$$

The electrical loop length ($kl_0(i)$) can then be obtained, estimated, etc. at 435 in any appropriate manner. For example, using an approach similar to that discussed in Section 7.2.1.3.2 of the G.993.2 DSL standard, $kl_0(i,m)$ (where m is the upstream frequency band in the FDD, such as bands 220 in FIG. 2) can be estimated using the $h_i(f)$ attenuation model:

$$kl_0(i, m) = \operatorname*{mean}_{f \in m}\left(\frac{h_i(f)}{\sqrt{f}}\right)$$

(where optionally the mean runs over the frequencies belonging to band m, in which case the a and b parameters derived below are for this band). Alternatively, the loss at a spot frequency, say 1 MHz, can be used:

$$kl_0(i) = h_i(f=1 \text{ MHz})$$

A linear regression (straight-line fit) can then be performed for UPBO parameters a and b (in each band) relative to $\sqrt{f}$ and $S_{ideal}(i,f) - kl_0(i)\sqrt{f}$, where the model is:

$$S_{ideal}(i,f) = -a - b\sqrt{f} + kl_0(i)\sqrt{f}$$

Thus UPBO parameters a and b and electrical loop length $kl_0(i)$ can be used in service at 440 (e.g., in a modem) as:

$$S_{actual}(i,f) = \min[S_{nominal}(f), -a - b\sqrt{f} + kl_0(i)\sqrt{f}]$$

In an exemplary system, a target data rate of 48 Mb/s can be chosen (this type of rate has been shown to be attainable at a loop length of 400 m of 24 awg cable). At a frequency of 10 MHz (which is in upstream VDSL band US2 (i.e., m=2), $h_{ref}$ (f=10 MHz)=27 dB. For a Line 1 with a length of 300 m, $h_i$ (f=10 MHz)=20 dB. $S_{nominal}$ can be obtained from an appropriate source (e.g., a VDSL standard); for this example $S_{nominal}$=−54 dBm/Hz, so the ideal PSD can be calculated as noted above:

$$S_{ideal}(1, f = 10 \text{ MHz}) = \min[S_{nominal}(f), S_{nominal}(f) + h_{ref}(f) - h_i(f)]$$

$$= S_{nominal} - \max[0, h_{ref}(f) - h_i(f)]$$

$$= -54 - \max[0, 27 - 20]$$

$$= -54 - 7$$

$$= -61 \text{ dBm/Hz}$$

Therefore, at this frequency (10 MHz), Line 1 will be given a transmit power of −61 dBm/Hz, instead of the full nominal value of −54 dBm/Hz called for in the VDSL standard. Note that in this ideal case the transmit power is reduced by an amount (7 dB) that is exactly the amount that the attenuation (27 dB) at the reference length (400 m) exceeds the attenuation (20 dB) at the length of Line 1 (300 m).

A second line, Line 2, is chosen to have a length of 500 m for which the attenuation at 10 MHz is 33.75 dB. Again the ideal PSD can be calculated as above:

$$S_{ideal}(2, f = 10 \text{ MHz}) = \min[S_{nominal}(f), S_{nominal}(f) + h_{ref}(f) - h_i(f)]$$

$$= S_{nominal} - \max[0, h_{ref}(f) - h_i(f)]$$

$$= -54 - \max[0, 27 - 33.75]$$

$$= -54 - 0$$

$$= -54 \text{ dBm/Hz}$$

Thus in the case of Line 2, the transmit power remains at the nominal value.

TABLE 3

| (example for f = 10 MHz) | Example | |
|---|---|---|
| | Line 1 (i = 1) | Line 2 (i = 2) |
| Loop length | 300 m | 500 m |
| $h_i$(f = 10 MHz) | 20 dB | 27 dB |
| max [0, $h_{ref}$(f) − $h_i$(f)] | 7 dB | 0 dB |
| Ideal transmit PSD | −61 dBm/Hz | −54 dBm/Hz |
| $kl_0$ | 6.41 | 10.67 |
| Transmit PSD using −a − b$\sqrt{f}$ + $kl_0$(i)$\sqrt{f}$ | −60.75 dBm/Hz | −54 dBm/Hz |

In practice, the attenuation at all upstream frequencies ($h_i(f)$) might not be available. For this reason, the a and b UPBO parameters determine a parameterized way to reduce the power without knowing $h_i(f)$, per se. Parameters a and b are compute a priori using calculations (the cable attenuation model) to produce $h_i(f)$. Values for a and b for this reference length, cable type and band (m=2; i.e., VDSL US2) are:

$$a = 53.76 \quad b = 8.62$$

So $S_{upbo} = S_{nominal} - \max[0, -a - b\sqrt{f} + kl_0(i)\sqrt{f}]$.

Bases other than a target maximum data rate can be used to determine UPBO parameters a and b and the electrical loop length $kl_0(i)$ for use in vectored DSL systems. For example, if an estimate can be made of the residual FEXT that is left after vector processing in a given upstream-end DSL device such as a DSLAM or other CO device, then that residual FEXT estimate likewise can serve as the basis for determining what UPBO settings will provide better operational performance than the UPBO approaches of standards and/or prior techniques.

Other methods, techniques, etc. can be used to determine new UPBO parameters. For example, in some embodiments, simulations (e.g., Monte Carlo simulations) can yield new parameters. Simulations can be constructed using appropriate bases. For example, the ATIS T1.417-2003 (R2007) Spectrum Management for Loop Transmission Systems standard is a loop modeling reference that can be used (e.g., using parameter, etc. in Annex C and Tables C.2 (cable model parameters for 26-AWG twisted pair modeling) and/or C.6 (cable model parameters for 24-AWG twisted pair modeling)). Likewise FEXT can be modeled using a NIPP-NAI model (e.g., ATIS-0600024 "Multiple-Input Multiple-Output Crosstalk Channel Model) or the like. In such processes, for example as shown as process 510 in FIG. 5, the UPBO parameters are initialized to no settings at 515 (i.e., the transmit PSD is set to its nominal settings). Factors such as vectoring group size, loop type(s), loop length distribution, service profiles, number of legacy lines, etc. can be used to then model the vectored DSL deployment at 520. Simulations can be run for the randomly selected loops, number of active lines, and partial cancellation scheme/operation to generate at 525 data rate performance (and/or other performance metrics) for the vectored group. Based on the data rate performance of the vectored group (and/or other metric(s)) for the specific UPBO setting(s), the UPBO performance metric (e.g., average-case data rate, worst-case data rate on certain loop lengths, etc.) can be derived. Statistics regarding the performance of the vectored group for each simulation instance are collected at

Figure 5:
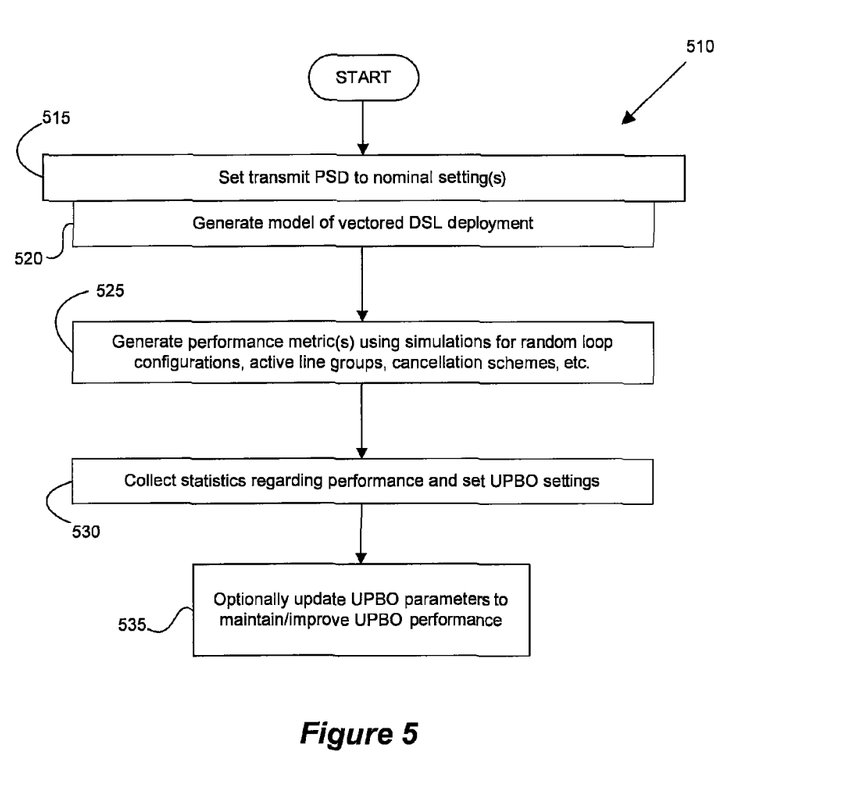
FIG. 5 is flow diagram illustrating one or more embodiments of the present invention.

530 and a UPBO performance metric derived (e.g., average, worst, percentage performance, etc.). The UPBO parameters can then be updated at 535 to maintain/improve UPBO performance (e.g., by repeating some or all of the above steps until UPBO performance improvement is achieved).

Figure 6:
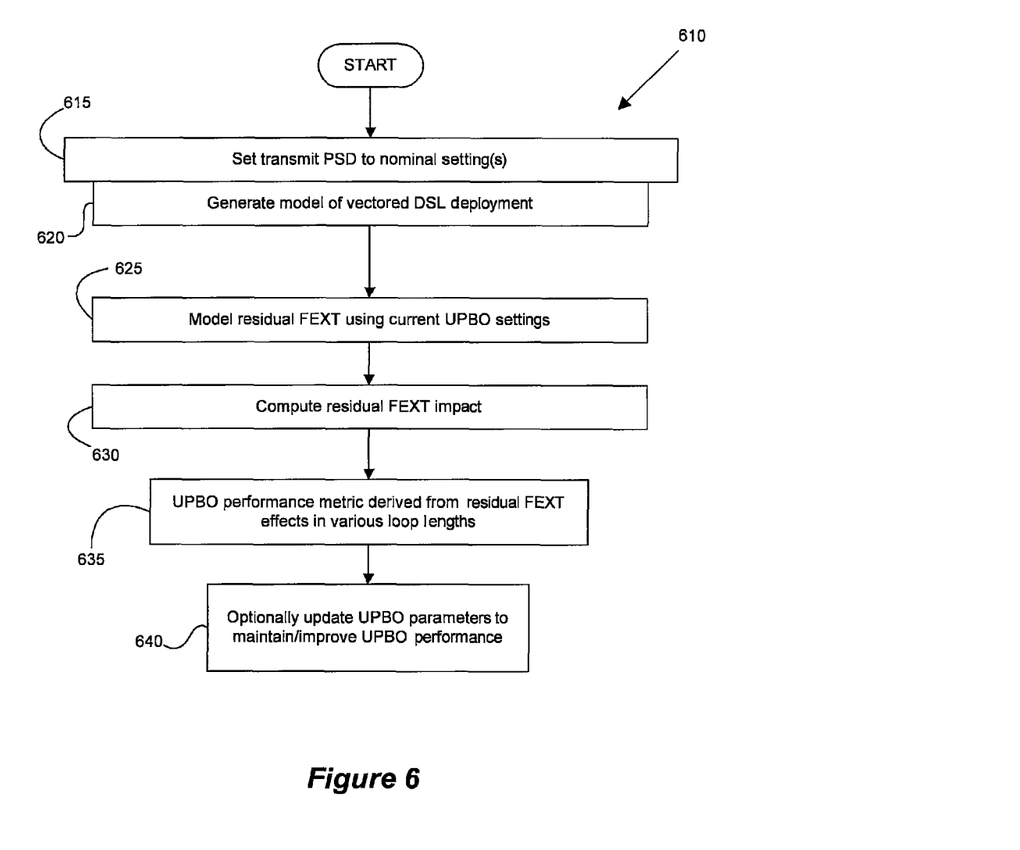
FIG. 6 is flow diagram illustrating one or more embodiments of the present invention.

Another process 610 for determining new UPBO parameters appropriate for use in connection with vectored DSL systems uses a deterministic method or process, as shown in FIG. 6. Again, the UPBO parameters are initialized to no settings 615 (i.e., the transmit PSD is set to its nominal settings) and factors such as vectoring group size, loop type(s), loop length distribution, service profiles, number of legacy lines, etc. are used to model the vectored DSL deployment at 620. Residual FEXT is then modeled using current UPBO settings at 625 (the residual FEXT will depend upon the deployment scenario and FEXT cancellation and UPBO). The impact of the residual FEXT on different loops and vectoring performance can then be computed at 630 (e.g., worst case, average case, etc.). A UPBO performance metric is derived at 635 based on the vectoring performance/impact of the residual FEXT on certain loop lengths (e.g., average-case data rate, worst-case data rate, etc.). The UPBO parameters are then updated at 640 to improve UPBO performance by repeating some or all of the above steps.

As will be appreciated from the foregoing, various approaches to adjusting traditional UPBO settings can provide significantly improved performance for vectored DSL systems in which partial cancellation leads to deficient UPBO performance using such traditional settings. The impact of partial cancellation vectoring and the residual FEXT necessarily resulting therefrom, whether explicit (e.g., measuring and accommodating residual FEXT in the vectored group) or implicit (e.g., using a target data rate that reflects the vastly improved performance achievable by vectored DSL systems as compared to non-vectored DSL systems), can inform the decision regarding which parameter adjustment approach to use in a given vectored DSL scenario.

Many features and advantages of the invention are apparent from the written description, and thus, the appended claims are intended to cover all such features and advantages. Further, numerous modifications and changes will readily occur to those skilled in the art, so the present invention is not limited to the exact operation and construction illustrated and described. Therefore, described embodiments are illustrative and not restrictive, and the invention should not be limited to the details given herein but should be defined by the following claims and their full scope of equivalents, whether foreseeable or unforeseeable now or in the future.

What is claimed is:

1. A method for performing upstream power back-off (UPBO) for a first digital subscriber line (DSL) line in a vectored DSL system comprising a vectored group of DSL lines comprising the first DSL line and a plurality of other DSL lines, wherein each vectored group DSL line comprises a customer premises equipment (CPE) modem coupled to a digital subscriber line access multiplexer (DSLAM) via a DSL line, the method comprising:
    identifying a partial far-end crosstalk (FEXT) cancellation scheme used in the vectored DSL system, wherein the partial cancellation scheme defines performing partial FEXT cancellation on upstream transmissions of the first DSL line, wherein performing partial FEXT cancellation on upstream transmissions of the first DSL line results in residual crosstalk remaining in received signals after partial cancellation has been performed, wherein the partial FEXT cancellation scheme includes:
    selecting a subset consisting of less than one or more of all possible disturbers, tones, channels and lines, and
    performing FEXT cancellation for only the selected subset;
    determining an effect of the residual crosstalk on the received signals associated with the partial FEXT cancellation scheme;
    calculating first DSL line partial cancellation UPBO parameters based on the determined effect of the residual crosstalk and one or more selected performance metrics, wherein the one or more performance metrics relate to transmissions by the first DSL line, wherein each one of the one or more performance metric is one of the following: a measured performance metric, a simulated performance metric, and an estimated performance metric; and
    operating the vectored group as a vectored DSL system using the calculated first DSL line partial cancellation UPBO parameters.

2. The method of claim 1 wherein the partial cancellation scheme comprises selecting a subset of dominant disturbers from all FEXT disturbers, wherein each FEXT disturber contributes FEXT to upstream transmissions of the first DSL line.

3. The method of claim 1 wherein the partial cancellation scheme comprises performing imperfect FEXT cancellation that yields residual crosstalk.

4. The method of claim 1 wherein one of the one or more performance metrics is at least one of the following: an upstream target data rate for the first DSL line; an upstream target signal to noise ratio (SNR) for the first DSL line.

5. The method of claim 4 wherein each DSL line in the vectored group operates in accordance with a VDSL standard.

6. The method of claim 5 wherein an upstream-end DSL device calculates the first DSL line partial cancellation UPBO parameters and transmits the calculated first DSL line partial cancellation UPBO parameters to the first DSL line CPE.

7. The method of claim 6 wherein the upstream-end DSL device is one of the following: a DSLAM, a vectoring control entity (VCE), a network management system (NMS).

8. A vectored digital subscriber line (DSL) system configured to perform upstream power back-off (UPBO) for a first DSL line in a vectored group of DSL lines comprising the first DSL line and a plurality of other DSL lines, wherein each vectored group DSL line comprises a customer premises equipment (CPE) modem coupled to a digital subscriber line access multiplexer (DSLAM) via a DSL line, the vectored DSL system comprising:
    a vectoring control entity (VCE) coupled to the DSLAM and configured to implement a partial cancellation scheme for performing partial far-end crosstalk (FEXT) cancellation on upstream transmissions of the first DSL line received as data in the DSLAM, wherein performing partial FEXT cancellation on upstream transmissions of the first DSL line results in residual crosstalk remaining in data by the DSLAM after partial cancellation has been performed, wherein the VCE is further configured to, in connection with the implemented partial FEXT cancellation scheme:
    select a subset consisting of less than one or more of all possible disturbers, tones, channels and lines, and
    perform FEXT cancellation for only the selected subset; and
an upstream-end processor coupled to the DSLAM and configured to:
    determine an effect of the residual crosstalk on the received signals associated with the partial FEXT cancellation scheme;

select one or more performance metrics relating to transmissions by the first DSL line, wherein each performance metric is one of the following: a measured performance metric; a simulated performance metric; an estimated performance metric; and calculate first DSL line partial cancellation UPBO parameters based on the determined effect of the residual crosstalk and the one or more selected performance metrics.

9. The vectored DSL system of claim 8 wherein the upstream-end processor comprises a processor located in at least one of the following: the DSLAM; the VCE, a network management system (NMS).

10. The vectored DSL system of claim 9 wherein the VCE is further configured to, in connection with the implemented partial cancellation scheme, select a subset of dominant disturbers from a set of all disturbers, wherein each disturber contributes FEXT to upstream transmissions of the first DSL line, further wherein each disturber is at least one of the following: a disturber line in the vectored group, a disturber tone used by the vectored group.

11. The vectored DSL system of claim 9 wherein the VCE is further configured to, in connection with the implemented partial cancellation scheme, perform imperfect FEXT partial cancellation that yields residual crosstalk.

12. The vectored DSL system of claim 9 wherein one of the one or more performance metrics comprises at least one of the following: an upstream target data rate for the first DSL line, an upstream target signal to noise ratio (SNR) for the first DSL line.

13. The vectored DSL system of claim 12 wherein each DSL line in the vectored group operates in accordance with a VDSL standard.

14. The vectored DSL system of claim 8 wherein the upstream-end processor transmits the calculated first line partial cancellation UPBO parameters to the CPE of the first DSL line.

* * * * *